(12) United States Patent
Weh et al.

(10) Patent No.: US 6,375,152 B1
(45) Date of Patent: *Apr. 23, 2002

(54) QUICK-CONNECT COUPLING

(75) Inventors: Wolfgang Weh, Illertisssen; Erwin Weh, Illertissen, both of (DE)

(73) Assignee: Weh, GmbH, Illertissen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/423,342

(22) PCT Filed: May 22, 1998

(86) PCT No.: PCT/EP98/03048

§ 371 Date: Nov. 22, 1999

§ 102(e) Date: Nov. 22, 1999

(87) PCT Pub. No.: WO98/53239

PCT Pub. Date: Nov. 26, 1998

(30) Foreign Application Priority Data

May 22, 1997 (DE) ..................... 297 09 040 U
Jul. 23, 1997 (DE) ..................... 297 13 116 U

(51) Int. Cl.$^7$ ............................... F16L 37/28
(52) U.S. Cl. .................. 251/149.6; 285/35; 285/316

(58) Field of Search ............... 137/614.04, 614.03, 137/614.02, 614; 285/35, 316, 315; 251/149.6

(56) References Cited

U.S. PATENT DOCUMENTS 5,564,471 A * 10/1996 Wilder et al. .......... 137/614.04
5,927,683 A * 7/1999 Weh et al. ................ 251/149.6
6,073,974 A * 6/2000 Meisinger et al. ...... 285/316 X

FOREIGN PATENT DOCUMENTS

EP 0039977 * 11/1981
WO WO 93/20378 * 11/1993

* cited by examiner

Primary Examiner—Kevin Lee
(74) Attorney, Agent, or Firm—Knobbe, Martens, Olson & Bear, LLP

(57) ABSTRACT

A quick connect coupling for transmitting fluids includes a tubular housing and spreadable locking elements fixed on the housing for connection to a correspondingly formed connector. A sealing piston is slidable centrally in the housing for engagement with the connector and surrounded by an axially movable sliding sleeve. The sliding sleeve retains the locking elements in the locking position in the coupled position of the quick connect coupling.

18 Claims, 4 Drawing Sheets

QUICK-CONNECT COUPLING

FIELD OF THE INVENTION

This invention relates to a quick connect coupling for transmitting gaseous and/or liquid fluids, especially for filling gas tanks.

A reliable, tight and rapidly connected plug-in coupling has to be provided by such quick connect couplings, for transmitting a fluid from a pressure source, for example a refilling cylinder or a pressure tank. Simple, problem-free operation of the quick connect coupling is particularly important, so that problem-free handling is made possible, even under unfavourable conditions, such as with dangerous fluids or high connection pressures.

BACKGROUND OF THE INVENTION

Such a quick connect coupling is described in EP-A 0 340 879, wherein the quick connect coupling comprises a housing with a fluid inlet and a fluid outlet, as well as a plurality of valves, in order to ensure reliable sealing of the quick connect coupling until the connection is completely effected. These valves are operated after attaching the quick connect coupling in a specific, predetermined sequence, wherein the outlet valve is opened first, then the collet jaws are closed by further movement of a control lever and finally the inlet valve is opened. The control lever engages via an eccentric shaft with the sliding sleeve for actuating the collet jaws and with a central sealed piston, which also opens the fluid inlet after completed attachment of the plug-in coupling.

Although a particularly secure connection is provided by this, the structure of this coupling is relatively expensive, on account of the many components. In addition, operation is relatively complex, since the operation of the control lever is necessary in addition to plugging in the coupling, so that single-handed operation is hardly possible.

Such a quick connector is further known from WO-A 93/20378 of the applicant, especially for filling gas cylinders, wherein a quick connect device in the form of collet jaws with an engagement profile is provided in the region of the outlet. A hollow sealing piston slidably movable in the coupling housing is also described, being connected trough an actuating device connected to a sliding sleeve for closing and opening the collet jaws. The handling of his quick connect coupling is also open to improvement. Further plug-in couplings are known from EP 0 382 723 and DE 3 518 019 of the applicant, in which similar disadvantages apply, in particular canted attachment of the connection coupling and thus its opening with fluid release with (still) incompletely made sealing connection cannot be completely ruled out.

SUMMARY OF THE INVENTION

Accordingly the invention is based on the object of providing a quick connect coupling of the kind initially specified which facilitates particularly reliable and simple handling with a simple structure, This object is met by a quick connect coupling for transmitting gaseous and/or liquid fluids. The quick connect coupling includes a tubular housing, spreadable locking elements fixed on the housing for connection to a correspondingly formed connector, and a sealing piston slidable centrally in the housing for engagement with the connector. The sealing piston is surrounded by an axially movable sliding sleeve which retains the locking elements in the locking position in the coupled position of the quick connect coupling. Preferred developments of the invention form the subject matter of the dependent claims.

The proposed quick connect coupling is distinguished by simple operation, which is also particularly reliable, since it can be coupled up and uncoupled with hardly any force. This proposed quick connect coupling is suitable for different connectors, especially for connecting nipples of gas tanks and for gas cylinder valves. Through the sealing piston which can slide or telescope in the housing, a more secure engagement of the locking elements, especially of the collet jaws, since the engagement profile of the collet jaws automatically adapts to the corresponding interlocking engagement profile of the complementary connector by virtue of the ability of the sealing piston to slide and the locking elements, especially the collet jaws are locked independently of the sealing piston. This is especially important, since the corresponding connection nipple, e.g. for a gas tank, can be made relatively simple. Because of the ability of the sealing piston to slide axially, a reliable, tight engagement between the engagement profile and the sealing surface at the end surface of the quick connect coupling results and only then does the outlet or check valve coupled thereto open. In particular excessively canted application of the coupling is avoided by this, i.e. the user is constrained to correct fitting, since both the opening of the fluid passage and also the coupling up at the coupling side are otherwise prevented. Wear of or damage to the connecting profile is also reliably avoided through this, on both the coupling and the nipple side.

The realisation of the quick connect coupling by means of an outer control sleeve is also especially important, preferably for pneumatic actuation of the coupling, so that a reliable and rapid, one-handed operation of the quick connect coupling is facilitated in an especially simple manner.

BRIEF DESCRIPTION OF THE DRAWINGS

An embodiment will now be explained and described in more detail with reference to the accompanying drawings, in which.

DETAILED DESCRIPTION OF THE INVENTION

Figure 1:
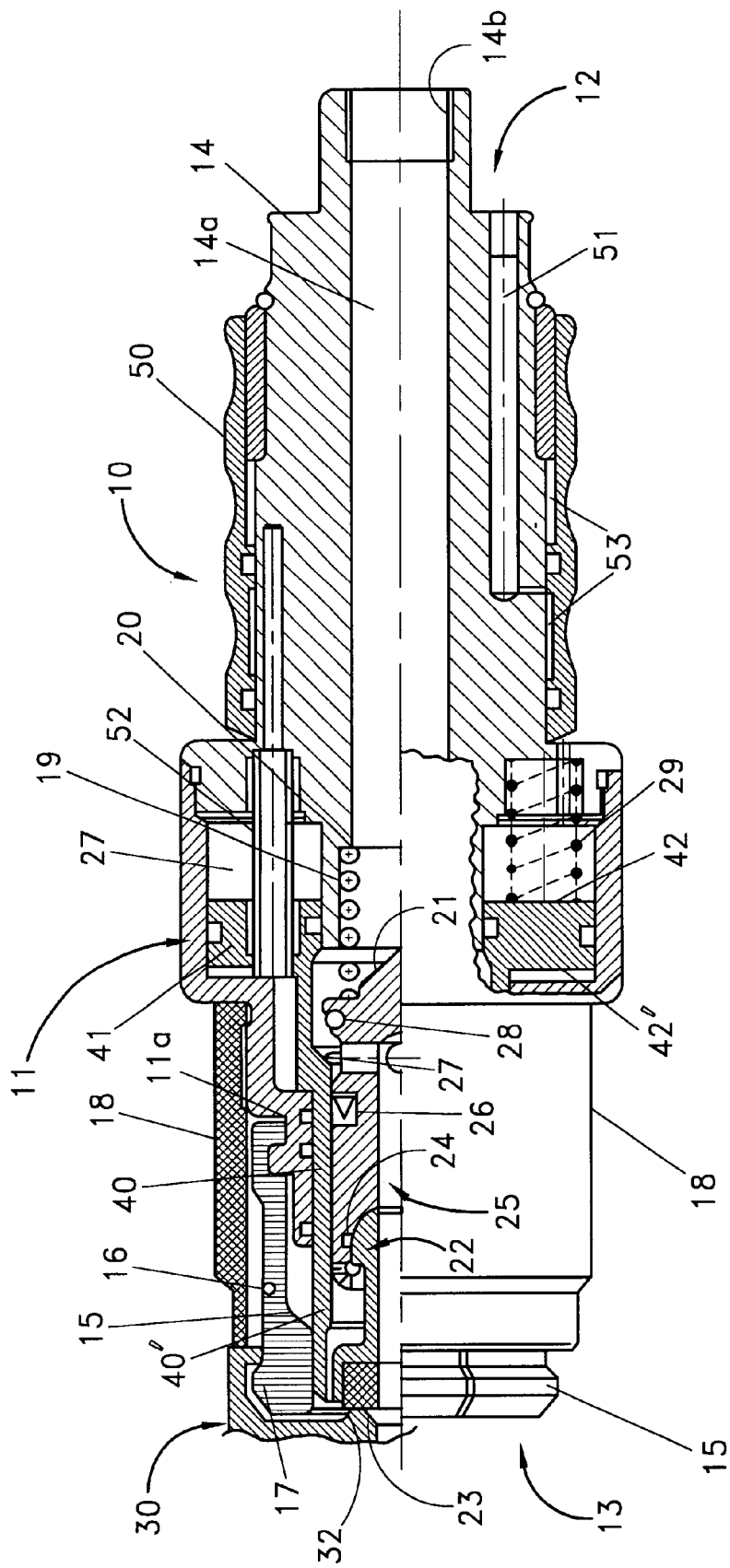
FIG. 1 is a side view of a quick connect coupling for a connecting nipple as a connector, wherein the quick connect coupling is shown in longitudinal half section and in the connected position.

In FIG. 1 there is shown a preferred embodiment of a quick connect coupling 10 with coupling to a complementary connector 30 shown only in part, in the form of a nipple. The quick connect coupling 10 comprises a tubular housing 11, wherein the right end here serves as the inlet 12 and the left end as the outlet 13 for passing the transmitted fluid on to the connecting nipple 30. The inlet 12 to the housing 11 comprises a tubular connection adaptor 14, which is screwed into the housing 11 and has a through passage 14a in the form of a central bore. The connection adaptor 14 has a thread 14b at its end here on the right, to which a hose or a pipeline can be connected for supplying the fluid to be transmitted. The connection adaptor 14 can be designed to match the fluid to be transmitted, especially the currently desired feed angle, passage cross-section, etc.

On the end of the housing 11 remote from the connection adaptor 14, namely the outlet 13, a plurality of locking elements are provided, in the form of elongated collet jaws 15, which are spread radially inwards in the unillustrated position before insertion into the connector 30. The elongated collet jaws 15, of which at least three and in general six are arranged round the housing 11, are hooked into an annular groove 11a of the housing 11 at the ends here on the right and are biased by a spring ring 16 so that the collet jaws 15 are spread radially inwards (cf. also FIG. 3). The collet jaws 15 comprise interlocking engagement profiles 17 on the outwardly offset surface corresponding to the hook-shaped connection profile 31 of the connector 30 at their end here on the left.

Around the collet jaws 15 there is provided an outer sleeve 18, preferably of plastics material or rubber, which is guided on the cylindrical outer wall of the housing 11. At the end of the housing 11 at the outlet 13 there is provided a sealing piston 22 which can preferably pivot in all directions by means of a ball joint and which comprises on its front end face a sealing ring 23 for abutment against a tapered sealing surface 32 of the connection nipple 30. The sealing piston 22 is sealed by means of an inset sealing ring 24, so that gaseous and/or liquid fluid flowing essentially along the central axis of the plug-in connector coupling 10 cannot escape to the outside. Moreover a compression spring 19, which is pre-stressed in the direction of the connection nipple 30. is arranged in the flow path along the through passage 14a. The compression spring 19 supported by a shoulder 20 on the connection adaptor 14 bears against a valve cone 21 of a check valve 25.

It is important that the check valve 25 mounted centrally on a valve stem in extension of the sealing piston 22 seals by means of a sealing ring 28 relative to a sealing surface 27 on an annular or sliding sleeve 40 in the closed position. The check valve 25 is biased by the compression spring 19, which is mounted by mean of the shoulder 20 in the connection adaptor 14 and is supported against the latter. Through this check valve 25 and the sealing piston 22 coupled thereto it is ensured that fluid fed through the connection adaptor 14 cannot flow out in the uncoupled position or up to briefly before the connection of the quick connect coupling 10 to the connection nipple 30, even with the connecting tap on the refilling cylinder or the like open.

The check valve 25 has a centrally arranged through passage facing towards the outlet 13 in continuation of the through passage 14a. After completed connection of the quick connect coupling 10, with interlocking engagement of the collet jaws 15 through the sliding sleeve 40 or a head piece 40' screwed thereon at the end opposite the connection nipple 30, this through passage cooperates with the through passage 14a, whereby the check valve 25 with the sealing surface 27/28 is forced into the open position when connection is made.

Of particular importance is the annular or sliding sleeve 40 which is guided on the outer periphery of the sealing piston 22 and of the check valve 25 and is biased by at least one compression spring 29, preferably in a pressure space 27, inside the housing 11. The compression spring 29 (cf. also FIG. 3) is supported on a recess of the housing 11 or of the connection adaptor 14. As can be seen from the drawing, the tapered end of the sliding sleeve 40 or the head piece 40' screwed thereon facing the outlet 13 engages on the inner surface (15' in FIG. 2) of the collet jaws 15, whereby these are retained in their radially spread-out locking position. The sliding sleeve 40 is pushed by the compression spring 29 up to the inwardly offset region of the housing 11, whereby a stop for the sliding movement of the sliding sleeve 40 is obtained at the sane time. Since the sealing piston 22 with the collect jaws 15 is mounted slidably in the sliding sleeve 40, the engagement profile 17 can engage in the opposed profile 31 of the connection nipple 30 with especially small coupling force, depending on the engagement conditions. In general the spring force of the compression spring 29 is already enough for this, in order to ensure the closed position here shown with locking of the locking elements, in particular the collet jaws 15, in independent manner, through axial displacement of the sliding sleeve 40 with the sealing piston 22 mounted therein.

In order to facilitate further the manual actuation of the sliding sleeve 40 for the coupling and uncoupling, for example with a manual lever according to the initially recited DE 3 518 019 or an eccentric lever according to EP-A 0 340 879, pneumatic assistance can also be provided by means of an actuating device 50, an air channel 51, an air feed sleeve 52 and two annular channels 53. Through axial movement of the actuating device 50 the air channel 51 is connected in the position here shown through the annular channels 53 to the air feed sleeve 52, so that a piston face 42' on a piston 42 of the sliding sleeve 40 is affected and this is thereby retracted. In order to increase the pushing force of the sliding sleeve 40 into the locking position, supplementing the compression springs 29, a piston annular surface 42 (corresponding to the piston surface 22a in FIG. 3) can be formed within the housing 11 on the piston 41 with a greater diameter.

Figure 2:
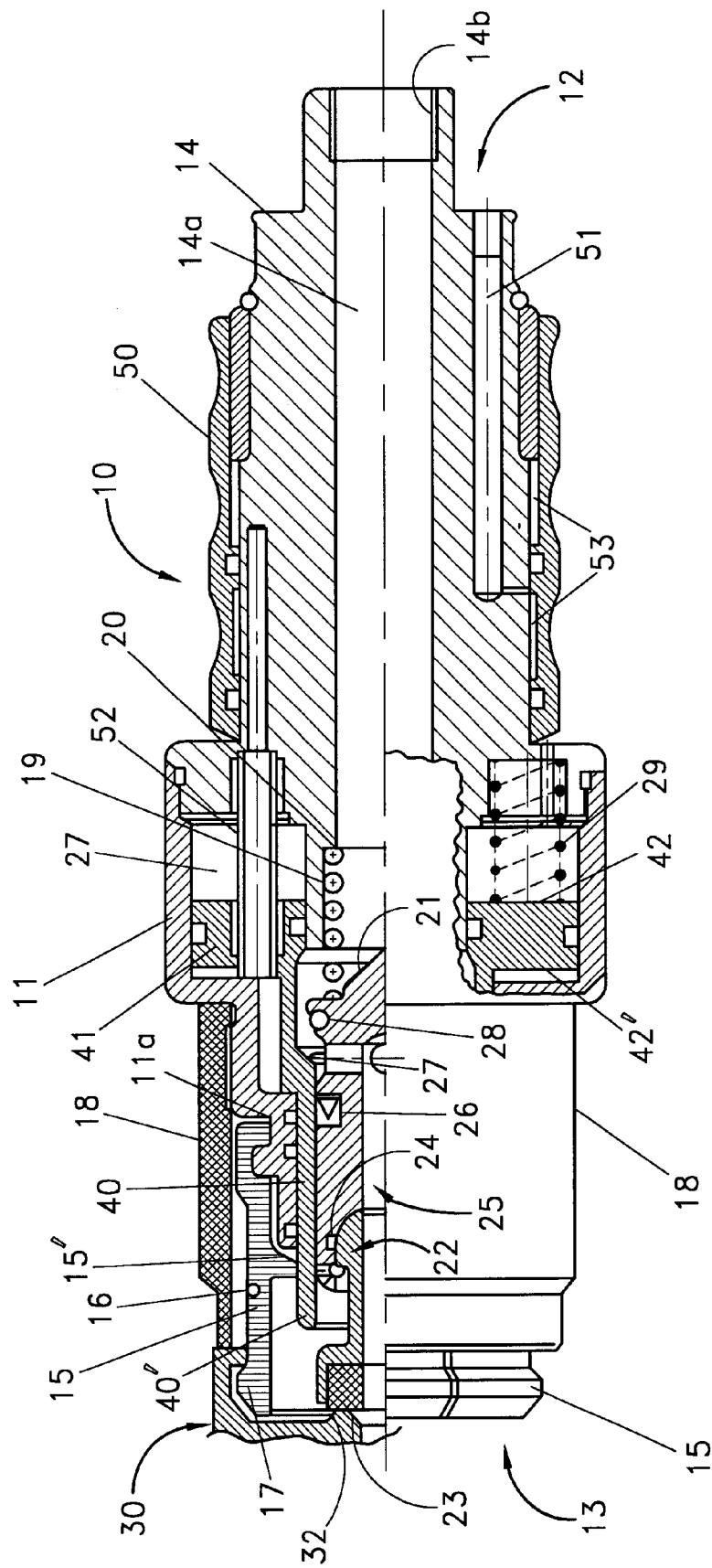
FIG. 2 shows a modified embodiment of the quick connect coupling, also in the connected position.

The quick connect coupling 10 is shown in FIG. 2 in a modified embodiment, wherein the head piece 40' of the sliding sleeve 40, which can also be formed in one piece, is made somewhat shorter, with otherwise like reference numerals for the same components. A greater ability of the sealing piston 22 to pivot is hereby attained, whereby this piston can also be made in one piece with or rigid relative to the valve stem of the check valve 25. The outer peripheral surface or the sealing piston 22 or the valve stem of the check valve 25 can also bear directly on the here offset inner surfaces 15' of the collect jaws 15 for locking these. As can be seen, on inserting or plugging on the quick connect coupling 10 into or on to the connector 30, the end sealing ring 23 on he sealing piston 22 is brought into contact with the connector 30. The sealing ring 23 thus comes into firm contact with the sealing surface 32, before the check valve 25 at n the sealing surfaces 27, 28 can open, so that escape of fluid which is present on the valve cone 21 of the check valve 25 on the coupling side is avoided. Through the engagement of the sealing ring 23 on the sealing surface 22 the sealing piston 22 is moreover pushed to the right into the open position, while however the sliding sleeve 40 or its head piece 40' or the outer peripheral surface of the sealing piston 22 or the valve stem of the check valve 25 contacts the collect jaws 15 at their inner surfaces 15' and holds them spread out in the locking position.

It should be noted that, during this coupling movement, the sealing piston 22 together with the sliding sleeve 40 is first pushed to the right against the spring force of the compression spring 19, the check valve 25 still being closed. After a small stroke of a few millimetres, the inner surface 15' of the collet jaws 15 bearing on the outer surface of the sliding sleeve 40 or in general of the sealing piston 22 are spread into their blocking position, so that the engagement profile 17 engages with the correspondingly formed connection profile 31 of the connection nipple 30. The sliding sleeve 40 is practically simultaneously free through this for the axial movement to the left, since the sliding sleeve 40 is also acted on by the compression spring 29. Through this axial movement of the sliding sleeve 40 and/or of the sealing piston 22, this/these engage on the inner surfaces 15' of the collet jaws 15 in the manner of a collar, so that these are retained interlocked in their spread, engagement position on the connector 30.

It should be noted that the sealing piston 22 can still move pivotally slightly in the connected position here shown in FIG. 2. The surface on the valve piston 21, which has a greater effective surface than in the region of the contact surface between the sealing ring 23 and the sealing surface 32, is also important. This ensures that, with the flow direction essentially along the central axis of the quick connect coupling 10, the sealing piston 22 presses with its sealing ring 23 ever more tightly on the sealing surface 32 with increasing pressure. A servo action is obtained through this, i.e. a stronger pressure of the sealing ring 23 with increasing fluid pressure and thus a particularly reliable sealing of the quick connect coupling 10.

In order to release the quick connect coupling 10 and thus restore the connected position shown in FIG. 2 to the open position, the actuating sleeve 50 is here retracted by hand through profiling on the outer surface. After this preferably pneumatic displacement (or by means of a lever) with retraction of the sliding sleeve 40 through a short stoke (corresponding to the length of the pressure chamber 27), the collet jaws 15 can spread radially inwardly again (or outwardly with external engagement with external collet jaw mounting), whereby the check valve 25 is simultaneously pushed here to the left towards the outlet end 13, within the sliding sleeve 40, under the action of the compression spring 19. Before the sealing contact is thus released between the sealing piston 22 and the sealing surface 32, the sealing surface 27/28 of the check valve 25 is closed, on account of the ability of the valve stem of the check valve 25 to move axially. Very rapid closure of the check valve 25 is achieved though this practically simultaneous sequence, so that no fluid volume can escape.

The conical form of the tip of the sliding sleeve 40 is also important in this, since the end facing the outlet 13 or the head piece 40' assists the spreading out movement of the collet jaws 15, so that the coupling of the quick connect coupling 10 is effected practically force-free and thus damage to the engagement profile 17 or the connection profile 31 is avoided. The sliding sleeve 40 also allows reliable fitting of the quick connect coupling 10 on to the connection nipple 30, while the collet jaws 15 preferred as the locking element are only closed when the sealing contact between the sealing surface 32 or seal 33 in FIG. 4 and the sealing ring 23 is ensured, since the closing position of the check valve 25 is maintained long enough for the collet jaws 15 to be locked by the axial displacement of the sealing piston 22 and the freeing of the sliding sleeve 40 arising therefrom in direct sequence, in order thereby to produce very abrupt and especially reliable connection. The head piece 40' of the sliding sleeve is preferably fixed interchangeably on the sliding sleeve 40 for adaptation to different collet jaw shapes or their inner surfaces 15'.

Figure 3:
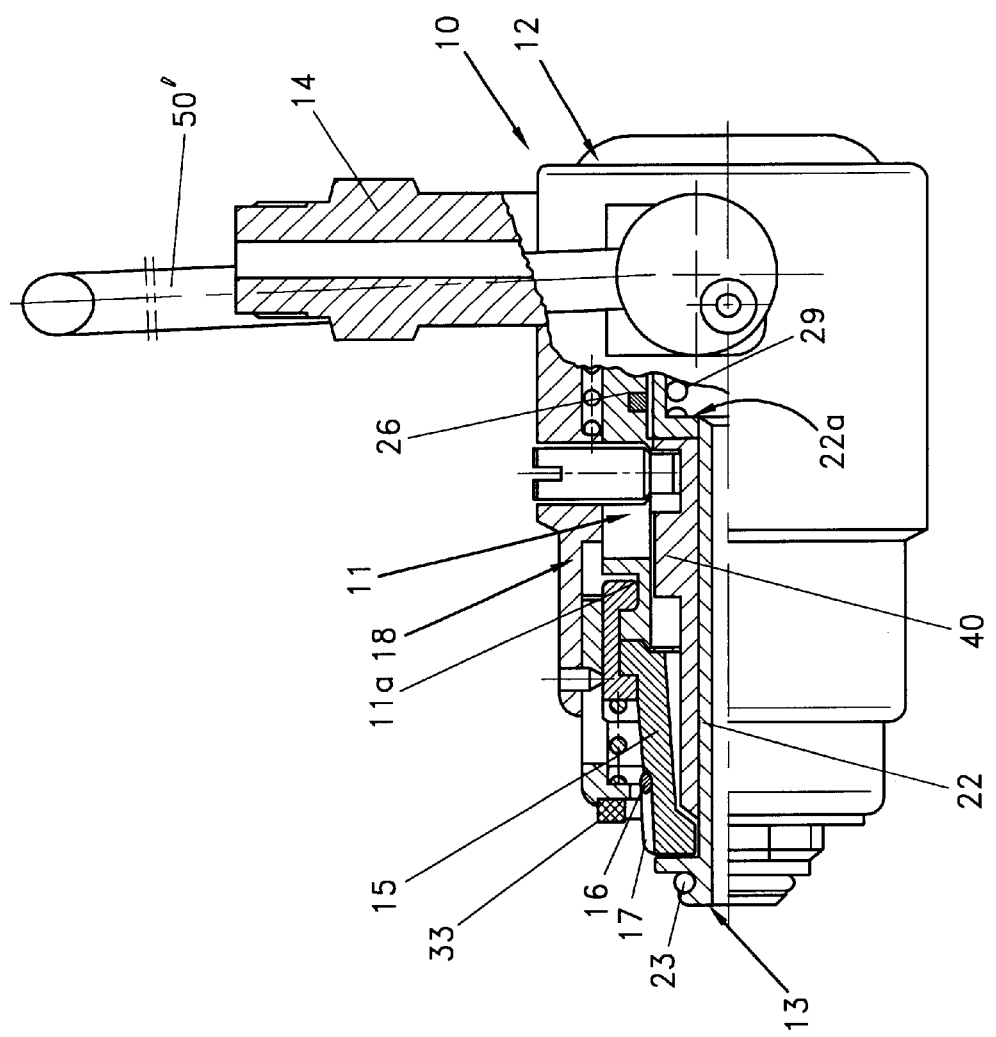
FIG. 3 shows a further embodiment of the quick connect coupling before connection.
Figure 4:
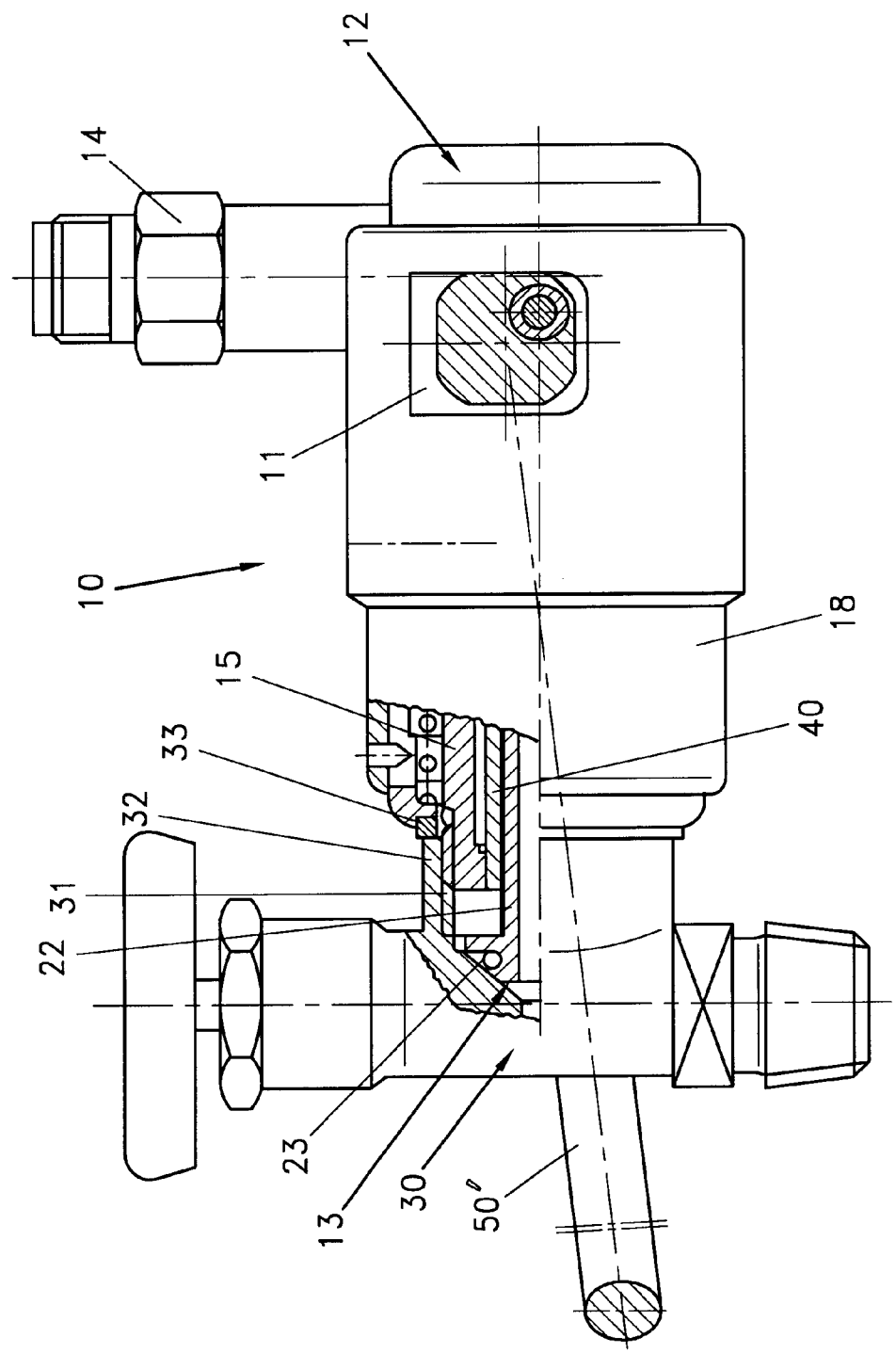
FIG. 4 shows the quick connect coupling according to FIG. 3 in the connected position.

A further modified embodiment especially for gas cylinder valves is shown in FIGS. 3 and 4, wherein components acting in the same way are given the same reference numerals. A manual lever 50' is here provided as an actuating device, which acts on an eccentric not described in more detail, as known from the initially recited state of the art.

What is claimed is:

1. A quick connect coupling for transmitting fluids, comprising:
   a tubular housing;
   spreadable locking elements fixed on the housing for connection to a correspondingly formed connector; and
   a sealing piston slidable centrally in the housing for engagement with the connector and surrounded by an axially movable sliding sleeve which retains the locking elements in the locking position in the coupled position of the quick connect coupling, wherein the sliding sleeve is surrounded by the locking elements.

2. The quick connect coupling of claim 1, wherein the locking elements include collet jaws having an engagement profile.

3. The quick connect coupling of claim 1, further comprising a compression spring acting on at least one of the sealing piston and the sliding sleeve.

4. The quick connect coupling of claim 1, further comprising a sealing ring between the sealing piston and the sliding sleeve.

5. The quick connect coupling of claim 3, further comprising a sealing ring between the sealing piston and the sliding sleeve.

6. The quick connect coupling of claim 1, wherein the sliding sleeve is configured to be guided on an inner surface of the housing.

7. The quick connect coupling of claim 4, wherein the sliding sleeve is configured to be guided on an inner surface of the housing.

8. The quick connect coupling of claim 1, wherein at least one of the sliding sleeve and the sealing piston has a piston annular surface having a greater effective area than an axially opposed piston surface.

9. The quick connect coupling of claim 6, wherein at least one of the sliding sleeve and the sealing piston has a piston annular surface having a greater effective area than an axially opposed piston surface.

10. The quick connect coupling of claim 1, further comprising a check valve connected to the sealing piston, the check valve and the sealing piston configured to be guided in the sliding sleeve.

11. The quick connect coupling of claim 8, further comprising a check valve connected to the sealing piston, the check valve and the sealing piston configured to be guided in the sliding sleeve.

12. The quick connect coupling of claim 10, wherein the check valve is formed in one piece with the sealing piston.

13. The quick connect coupling of claim 11, wherein the check valve is formed in one piece with the sealing piston.

14. The quick connect coupling of claim 10, wherein the sealing piston is pivotally mounted on the check valve by means of a ball joint.

15. The quick connect coupling of claim 11, wherein the sealing piston is pivotally mounted on the check valve by means of a ball joint.

16. The quick connect coupling of claim 1, wherein the sliding sleeve has an interchangeable head piece.

17. The quick connect coupling of claim 14, wherein the sliding sleeve has an interchangeable head piece.

18. A quick connect coupling for transmitting fluids, comprising:
   a tubular housing;
   spreadable locking elements fixed on the housing for connection to a correspondingly formed connector;
   a sealing piston slidable centrally in the housing for engagement with the connector and surrounded by an axially movable sliding sleeve which retains the locking elements in the locking position in the coupled position of the quick connect coupling; and
   a check valve connected to the sealing piston, the check valve and the sealing piston configured to be guided in the sliding sleeve.

* * * * *